United States Patent
Allison et al.

[19]

[11] Patent Number: 6,161,396
[45] Date of Patent: Dec. 19, 2000

[54] EVAPORATOR PLATE ASSEMBLY FOR USE IN A MACHINE FOR PRODUCING ICE

[75] Inventors: Matthew Allison, Gurnee; Christopher Salatino, Arlington Heights, both of Ill.

[73] Assignee: Scotsman Group, Inc., Vernon Hills, Ill.

[21] Appl. No.: 09/328,577

[22] Filed: Jun. 9, 1999

[51] Int. Cl.[7] ..................................................... F25C 1/12
[52] U.S. Cl. ............................................. 62/347; 228/183
[58] Field of Search ........................... 62/347, 348, 352; 228/183

[56] References Cited

U.S. PATENT DOCUMENTS

| | | |
|---|---|---|
| 3,430,452 | 3/1969 | Dedricks et al. . |
| 3,979,042 | 9/1976 | Peters ...................................... 228/183 |
| 4,072,262 | 2/1978 | Godrick et al. ......................... 228/183 |
| 4,412,429 | 11/1983 | Kohl . |
| 4,526,014 | 7/1985 | Suyama et al. . |
| 4,555,913 | 12/1985 | Ishiguro . |
| 4,577,473 | 3/1986 | Ishiguro . |
| 4,580,410 | 4/1986 | Toya . |
| 4,601,178 | 7/1986 | Suyama et al. . |
| 4,669,276 | 6/1987 | Sakai et al. . |
| 4,862,706 | 9/1989 | Yoshida et al. . |
| 4,995,245 | 2/1991 | Chang . |
| 5,182,925 | 2/1993 | Alvarez et al. . |
| 5,193,357 | 3/1993 | Kohl et al. . |
| 5,464,145 | 11/1995 | Park et al. ............................... 228/183 |
| 5,479,707 | 1/1996 | Alvarez et al. . |
| 5,771,962 | 6/1998 | Evans et al. ............................. 228/183 |
| 6,012,511 | 1/2000 | Shinmura et al. ....................... 228/183 |

*Primary Examiner*—William E. Tapolcal
*Attorney, Agent, or Firm*—Ohlandt, Greeley, Ruggiero & Perle, L.L.P.

[57] ABSTRACT

An ice making machine having an evaporator plate assembly which is manufactured from two side plates and a serpentine shaped tube. Each side plate has vertical partitions integrally formed therein. The two side plates are bonded to the serpentine shaped tube through a braze process.

18 Claims, 2 Drawing Sheets

EVAPORATOR PLATE ASSEMBLY FOR USE IN A MACHINE FOR PRODUCING ICE

BACKGROUND OF THE INVENTION

1. Technical Field

The present invention relates generally to an apparatus for manufacturing ice. More particularly, the present invention relates to a unique construction for an evaporator plate assembly for use with the apparatus for manufacturing ice.

2. Discussion

Automatic ice making machines are commonplace. These ice making machines are found in food and drink service establishments, hotels, motels, sports arenas and various other places where large quantities of ice are needed on a continuous basis. Some of these ice making machines produce flaked ice while others produce ice shaped in a variety of configurations which are generally referred to as cubes. The present invention relates to an ice making machine that produces ice which is shaped in one of these various configurations or cubes.

Automatic ice manufacturing machines generally include a refrigeration system having a compressor, a condenser and an evaporator; a series of individual ice forming locations which may or may not be referred to as pockets; and a water supply system. In a typical ice manufacturing machine the evaporator section of the refrigeration system is connected to the series of individual ice forming locations so that these individual ice forming locations are directly cooled by the refrigeration system. Water may either be supplied to fill these ice forming locations if they are in the form of a series of pockets or water may be supplied to these ice forming locations by having the water trickle over or be sprayed onto the individual ice forming locations. The run-off of this trickled or sprayed water is usually recirculated within the water supply. The trickling or spraying methods of supplying water is normally preferred because these methods will produce clear ice while the static filled pockets method generally will produce white ice.

Automatic ice making machines are normally controlled by the level of supply of the ice in the storage portion of the ice making machine. When the supply of ice in the storage portion is insufficient, automatic controls cycle the ice making machine through ice production and ice harvest modes to supplement the supply of ice in the storage portion. In the production mode, the refrigeration system operates in a normal manner such that expanding refrigerant in the evaporator removes heat from the series of ice forming locations, freezing the water to form an ever growing layer of ice. When the ice thickness reaches a predetermined condition or a specified time period has elapsed, the ice making machine switches to harvest mode. Typically the harvest mode involves a valve change which directs hot refrigerant gasses to the evaporator. The ice forming locations are heated by the hot refrigerant gasses until the ice in contact with the evaporator begins to thaw. Normally some type of mechanism ensures that a vacuum is not formed between the individual ice pieces and the evaporator which normally involves the introduction of air between the individual ice pieces and the evaporator surface. Once the ice eventually falls from the evaporator, the valving on the refrigeration system is changed back to its original configuration, the production mode, and thus the cycle begins again. The ice making machine continues to cycle between the production mode and the harvest mode until some type of sensing system in the storage portion signals the refrigeration system to pause.

Current evaporators have been created by bonding evaporator tubes and partitions to a base wall. The evaporator tubes and the base wall are normally made of copper which is then given a nickel plating which shields the ice from the copper material. The forming of the copper tubes can create residual stresses in the material that may cause cracks. Additionally, the nickel plating which shields the ice from the copper material can flake off of the copper tubes. These types of evaporators have performed satisfactorily but they are relatively expensive to manufacture.

Moreover, some current evaporators are assembled through the use of a solder process. Evaporators assembled through this solder process can easily separate if water leaks into the internal surfaces of the evaporator when the unit is in its ice making mode. The maintenance expense relative to these types of evaporators is rather costly.

In order to overcome the problems associated with evaporators manufactured from tubes, partitions and base walls, and assembled through the use of a solder process, various designs of evaporators manufactured from sheets of stainless steel and assembled through various bonding methods have been developed. The stainless steel sheets are stamped into various configurations which permit refrigerant flow throughout the evaporator. The continued development of the stamped stainless steel evaporators has been directed to designs which simplify the manufacturing process and the assembly of the evaporators while keeping costs at a minimum and performance of the evaporator at a maximum.

SUMMARY OF THE INVENTION

It is a principal object of the present invention to provide an evaporator plate assembly having greatly improved joint strength.

A related object of the present invention is to provide an evaporator plate assembly that is assembled through the use of a brazing process.

It is another object of the present invention to provide an evaporator plate assembly which removes the residual stresses that can be created during the forming of the copper tubes, and prevents the nickel plating that shields the ice from the copper material from flaking off of the copper tubes.

It is still yet another object of the present invention to provide an evaporator plate assembly which would not separate if water leaks into the internal surfaces of the evaporator.

It is another object of the present invention to provide an evaporator plate assembly which allows ice to be made on both sides of the copper tubes and promotes ice to be formed in a distinctive shape.

The present invention provides an evaporator plate assembly including a stamped stainless steel evaporator which is manufactured from two formed sheets of stainless steel, and a formed and flattened or round serpentine shaped copper tube. The two formed stainless steel sheets form the outer walls of the evaporator. Numerous partitions are integrally formed as part of the two sheets forming the outer walls of the evaporator. The numerous partitions are integrally formed to the outside surfaces of the evaporator in order to separate the numerous ice forming locations. The two formed stainless steel sheets are bonded to the serpentine shaped copper tube through the use of a braze process.

Other advantages, benefits and objects of the present invention will become apparent to those skilled in the art from a reading of the subsequent detailed description, appended claims and accompanying drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
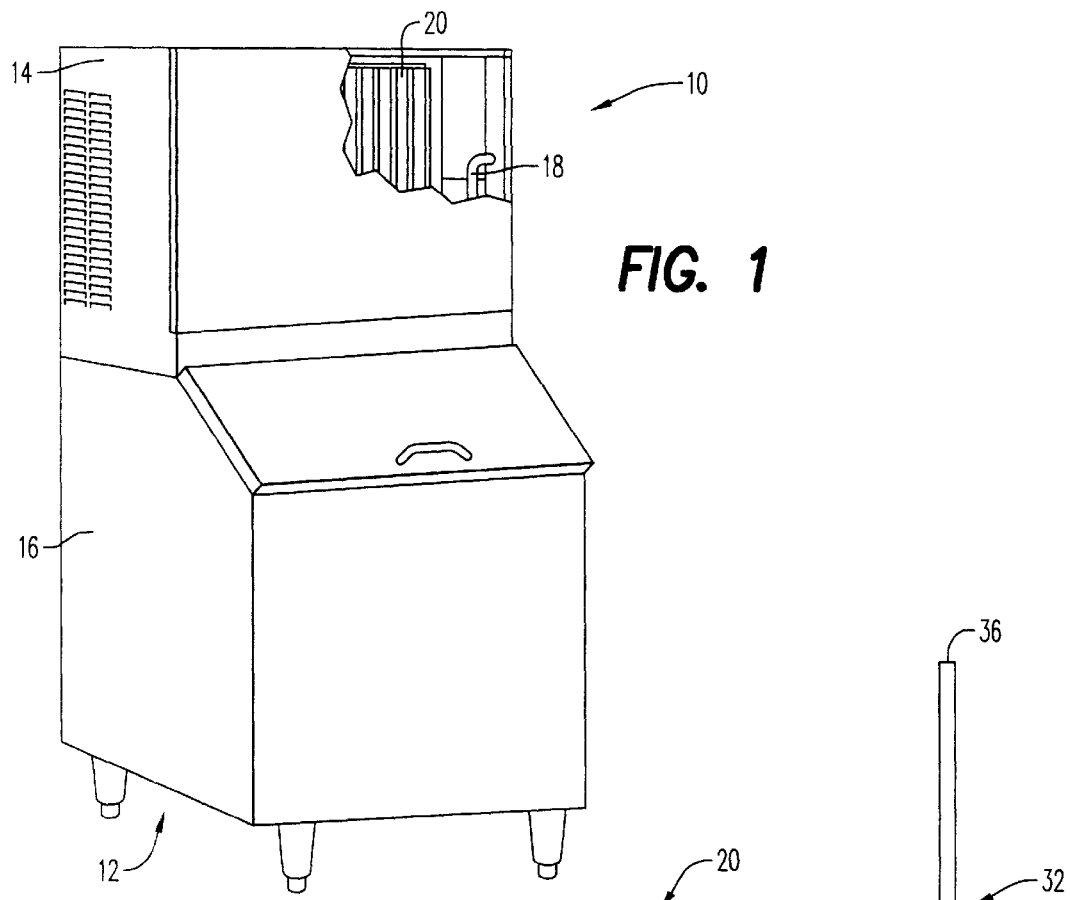
FIG. 1 is a perspective view of an automatic ice making machine incorporating the unique evaporator plate assembly in accordance with the present invention.

Referring now to the drawings in which like reference numerals designate like or corresponding parts throughout the several views, there is shown in FIG. 1 an automatic ice making machine incorporating the unique evaporator plate assembly in accordance with the present invention which is designated generally by the reference numeral 10. The automatic ice making machine 10 includes a housing 12 which defines a refrigeration section 14 and a storage section 16. A refrigeration system 18 is disposed within the refrigeration section 14 and includes a compressor (not shown, but commonly known), a condenser (not shown, but commonly known), a water supply system (not shown, but commonly known) and an evaporator plate assembly 20. The refrigeration system 18 operates in a production mode to expand refrigerant in the evaporator plate assembly 20 to remove heat from water supplied to the surface of the evaporator plate assembly 20 in order to freeze the water to create ice pieces as is well known in the art. When the ice pieces reach a predetermined size and/or after a predetermined time period, the ice making machine 10 switches from the above described production mode to a harvest mode to release the ice pieces from the evaporator plate assembly 20 and store them in the storage section 16. After completion of the harvest mode, the ice making machine 10 switches back to the production mode. This sequence will continue until a sensor (not shown, but commonly known) indicates that the storage section 16 contains a sufficient quantity of ice.

Referring now to FIGS. 2–5, the evaporator plate assembly 20 is shown including a first side plate 22, a second side plate 24 and a tube 26. The first side plate 22 is preferably formed from stainless steel. Integrally formed in the first side plate 22 are numerous vertical partitions 28. The second side plate 24 is also preferably formed from stainless steel. Similarly, integrally formed in the second side plate 24 are numerous vertical partitions 30. The vertical partitions 28 and 30 extend over the entire length and width of the first side plate 22 and the second side plate 24. The geometry of the first side plate 22 and the second side plate 24 promotes the formation of ice pieces in distinctive shapes.

Figure 2:
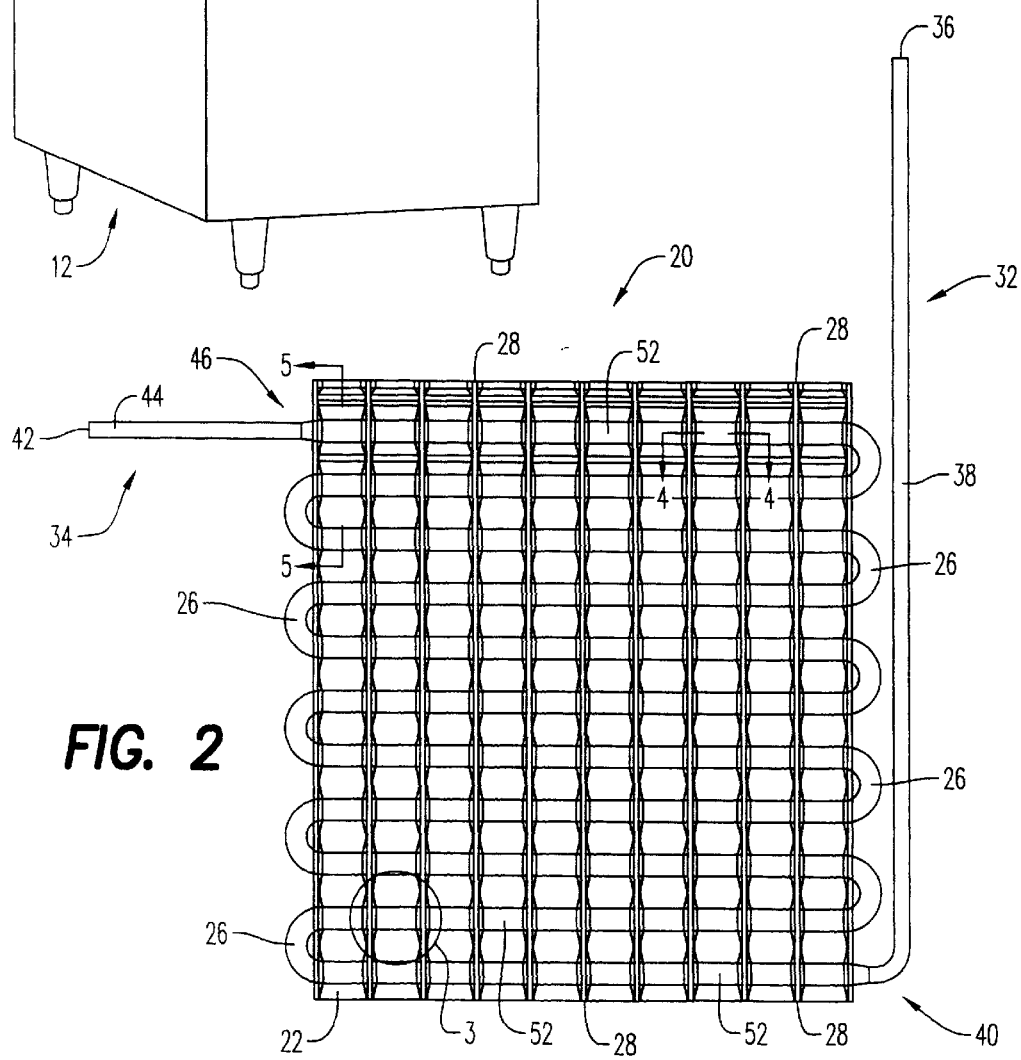
FIG. 2 is an elevational view of the evaporator plate assembly shown in FIG. 1.
Figure 5:
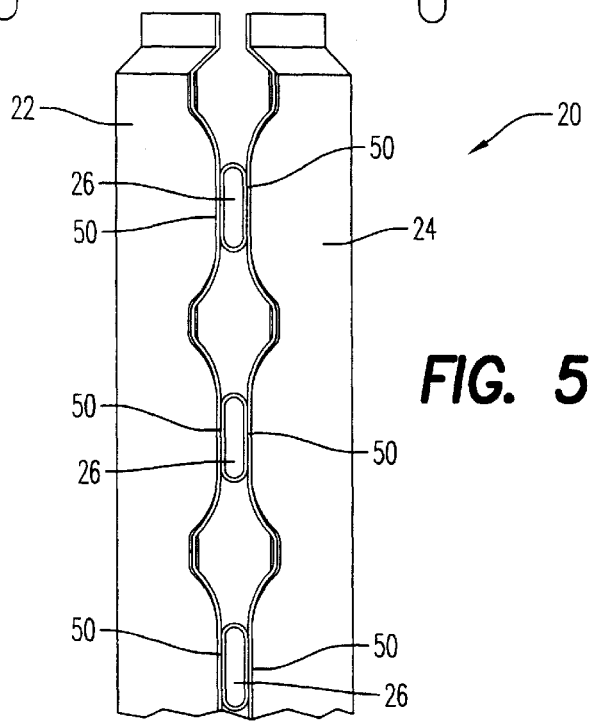
FIG. 5 is a cross-sectional view taken in the direction of arrows 5—5 shown in FIG. 2.

The tube 26 is serpentine in shape, may be flattened or round, and preferably manufactured from copper. As shown in FIGS. 2 and 5, the tube 26 which is serpentine in shape is sandwiched between the first side plate 22 and the second side plate 24. As illustrated, the tube 26 extends over the entire length and width of the first side plate 22 and the second side plate 24. The tube 26 also includes a refrigerant inlet portion 32 and a refrigerant outlet portion 34. The refrigerant inlet portion 32 includes an inlet 36 and an extension 38. As illustrated in FIG. 2, the extension 38 of the refrigerant inlet portion 32 is in fluid communication with the tube 26 at a lower portion 40 of the tube 26. The refrigerant outlet portion 34 includes an outlet 42 and an extension 44. As illustrated in FIG. 2, the extension 44 of the refrigerant outlet portion 34 is in fluid communication with the tube 26 at an upper portion 46 of the tube 26. The National Sanitation Foundation (NSF) requires that there be no exposed copper in the food zone. Thus, the tube 26 which is serpentine in shape, flattened or round, and preferably manufactured from copper is therefore plated with nickel or some similar material prior to assembly.

During assembly, the first side plate 22 and the second side plate 24 are bonded to the tube 26 which has previously been plated with nickel or some similar material. The first side plate 22 and the second side plate 24 are bonded to the tube 26 through a braze process. The braze alloy used during assembly reaches temperatures in excess of approximately 1,750° Fahrenheit so as to allow it to flow freely. An example of the braze alloy used is a nickel-base alloy. Accordingly, at this braze temperature, the nickel plating on the tube 26 will form a metallurgical bond with the copper of the tube 26, thereby preventing the nickel plating from flaking off of the copper tubes. Additionally, at this braze temperature, residual stresses associated with the formation of the copper tubes will be eliminated.

Figure 3:
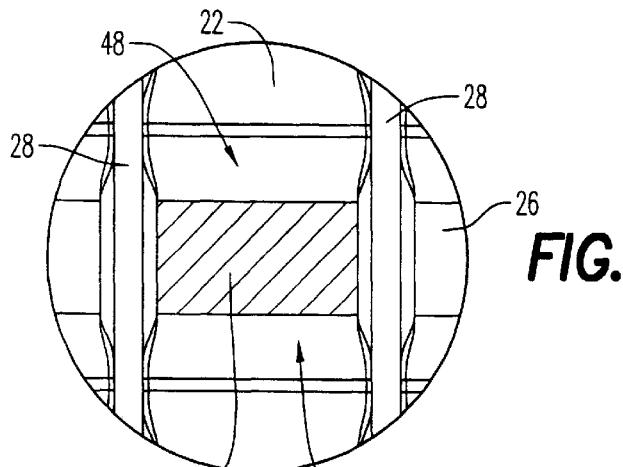
FIG. 3 is an enlarged view of a braze joint in accordance with the present invention illustrated in the circular area shown in FIG. 2.

FIG. 3 illustrates an enlarged view of a braze contact area 48. The braze contact area 48 is found on a portion of the tube 26, and a portion of the first side plate 22 and a portion of the second side plate 24 between the vertical partitions 28 and 30 of the first side plate 22 and the second side plate 24, respectively. Where the first side plate 22 and the second side plate 24 are bonded to the tube 26 through the braze process, a braze joint 50 is formed. The braze joint 50 is illustrated in FIG. 3 by diagonal shading. The braze joint 50 is formed between the tube 26, and the first side plate 22 and the second side plate 24 between the vertical partitions 28 and 30 of the first side plate 22 and the second side plate 24, respectively. There are approximately one-hundred and ten (110) braze joints 50 per side of the evaporator plate assembly 20, for a total of approximately two-hundred and twenty (220) braze joints 50. Additionally, the first side plate 22, the second side plate 24 and the tube 26 are assembled so that ice pieces may be made on both sides of the tube 26 which is serpentine in shape and may be flattened or round.

Figure 4:
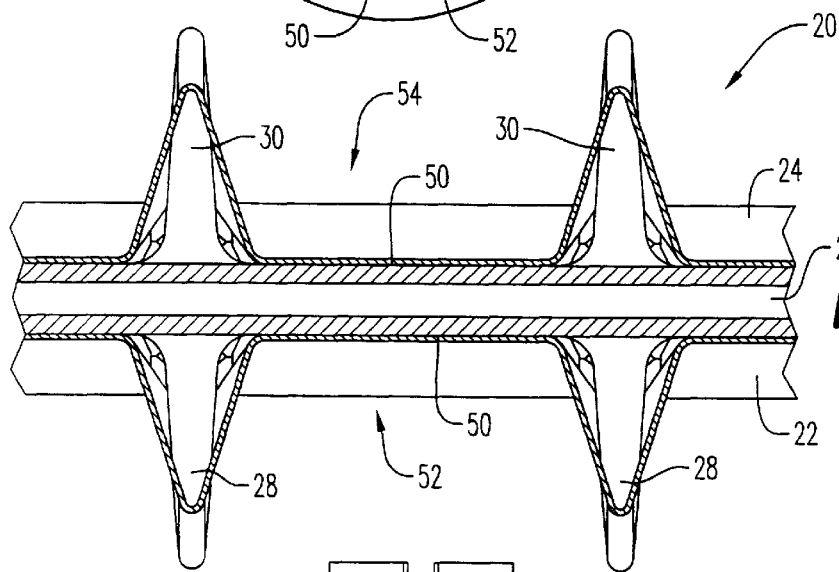
FIG. 4 is a cross-sectional view taken in the direction of arrows 4—4 shown in FIG. 2.

The vertical partitions 28, integrally formed on the first side plate 22, are spaced so as to form numerous channels 52. The vertical partitions 30, integrally formed on the second side plate 24, are similarly spaced so as to form numerous channels 54. The channels 52 on the first side plate 22 and the channels 54 on the second side plate 24 define the specific locations for the formation of ice pieces. As illustrated in FIGS. 3–5, the braze joints 50 are formed within channels 52 and 54.

The braze joints 50 provide greater strength to the evaporator plate assembly 20. This improved strength prevents the evaporator plate assembly 20 from separating if water leaks into the internal surfaces of the evaporator. Moreover, the evaporator plate assembly 20, as a result of the braze joints 50, has a greater bond strength than those evaporators assembled through the use of a solder process or various other bonding methods.

While the above detailed description describes the preferred embodiment of the present invention, it should be understood and appreciated that the invention is susceptible to modification, variation and alteration without departing from the proper scope and fair meaning of the accompanying claims.

What is claimed is:

1. An ice making machine comprising:

a housing; and a refrigeration system disposed within said housing, said refrigeration system including an evaporator plate assembly, said evaporator plate assembly including:

a first side plate;

a serpentine tube secured to said first side plate; and a second side plate secured to said serpentine tube, wherein said first side plate and said second side plate are secured to said serpentine tube through a braze process, and wherein said serpentine tube has a plated surface and said braze process forms braze joints which relieve residual stresses created during the formation of said serpentine tube, and forms a metallurgical bond between said serpentine tube and said plated surface.

2. The ice making machine according to claim 1, wherein said first plate and said second plate are formed from stainless steel sheets.

3. The ice making machine according to claim 2, wherein said evaporator plate assembly further comprises a first plurality of partitions connected to said first side plate and a second plurality of partitions connected to said second side plate.

4. The ice making machine according to claim 3, wherein said first plurality of partitions are integrally formed in said first side plate and said second plurality of partitions are integrally formed in said second side plate.

5. The ice making machine according to claim 1, wherein said serpentine tube is formed from copper.

6. The ice making machine according to claim 5, wherein said serpentine tube further comprises a refrigerant inlet portion in fluid communication with a lower portion of said serpentine tube and a refrigerant outlet portion in fluid communication with an upper portion of said serpentine tube.

7. The ice making machine according to claim 1, wherein said braze process further comprises a braze alloy having a melting temperature of greater than 1,750° Fahrenheit.

8. The ice making machine according to claim 1, wherein said evaporator plate assembly includes approximately 220 braze joints in total.

9. The ice making machine according to claim 1, wherein a geometry of said first side plate and a geometry of said second side plate promotes a formation of ice pieces in a distinctive shape.

10. An evaporator plate assembly comprising:

a first side plate;

a serpentine tube secured to said first side plate; and a second side plate secured to said serpentine tube, wherein said first side plate and said second side plate are secured to said serpentine tube through a braze process, and wherein said serpentine tube has a plated surface and said braze process forms braze joints which relieve residual stresses created during the formation of said serpentine tube, and forms a metallurgical bond between said serpentine tube and said plated surface.

11. The evaporator plate assembly according to claim 10, wherein said first side plate and second plate are formed from stainless steel sheets.

12. The evaporator plate assembly according to claim 11, further comprising a first plurality of partitions connected to said first side plate and a second plurality of partitions connected to said second side plate.

13. The evaporator plate assembly according to claim 12, wherein said first plurality of partitions are integrally formed in said first side plate and said second plurality of partitions are integrally formed in said second side plate.

14. The evaporator plate assembly according to claim 10, wherein said serpentine tube is formed from copper.

15. The evaporator plate assembly according to claim 14, wherein said serpentine tube further comprises a refrigerant inlet portion in fluid communication with a lower portion of said serpentine tube and a refrigerant outlet portion in fluid communication with an upper portion of said serpentine tube.

16. The evaporator plate assembly according to claim 10, wherein said braze process further comprises a braze alloy having a melting temperature of greater than 1,750 degrees Fahrenheit.

17. The evaporator plate assembly according to claim 10, wherein said braze joints number approximately 220 in total.

18. The evaporator plate assembly according to claim 10, wherein a geometry of said first side plate and a geometry of said second side plate promotes a formation of ice pieces in a distinctive shape.

* * * * *